US012678842B2

(12) United States Patent
Wielinga et al.

(10) Patent No.: US 12,678,842 B2
(45) Date of Patent: Jul. 14, 2026

(54) METHOD FOR DEGRADATION OF A PLASTIC-CONTAINING WASTE

(71) Applicant: ECO-HABITAT B.V., Heiloo (NL)

(72) Inventors: Eduard Wielinga, Schoorl (NL);
Servan Kreher, Heiloo (NL)

(73) Assignee: ECO-HABITAT B.V., Heiloo (NL)

( * ) Notice: Subject to any disclaimer, the term of this patent is extended or adjusted under 35 U.S.C. 154(b) by 744 days.

(21) Appl. No.: 18/016,721

(22) PCT Filed: Jul. 27, 2021

(86) PCT No.: PCT/EP2021/071037
§ 371 (c)(1),
(2) Date: Jan. 18, 2023

(87) PCT Pub. No.: WO2022/023360
PCT Pub. Date: Feb. 3, 2022

(65) Prior Publication Data
US 2023/0278083 A1 Sep. 7, 2023

(30) Foreign Application Priority Data
Jul. 28, 2020 (EP) .................................... 20188192

(51) Int. Cl.
*B09B 3/60* (2022.01)
*B09B 101/67* (2022.01)
*B09B 101/70* (2022.01)
*B09B 101/75* (2022.01)
*B09B 101/85* (2022.01)

(52) U.S. Cl.
CPC ............ *B09B 3/60* (2022.01); *B09B 2101/67* (2022.01); *B09B 2101/70* (2022.01); *B09B 2101/75* (2022.01); *B09B 2101/85* (2022.01)

(58) Field of Classification Search
None
See application file for complete search history.

(56) References Cited

FOREIGN PATENT DOCUMENTS

| CN | 108715818 | A | 10/2018 |
| JP | 2019156695 | A | 9/2019 |
| NL | 2018141 | * | 7/2018 |
| NL | 2018141 | A1 | 7/2018 |

OTHER PUBLICATIONS

Composting apparatus (Year: 2018).*
Castro-Aguirre et al. "Enhancing the biodegradation rate of poly (lactic acid) films and PLA bio-nanocomposites in simulated composting through bioaugmentation." Polymer Degradation and Stability 154 (2018): 46-54.
Grivalsky et al. "Aerobic biodegradation of aromatic aliphatic copolyester induced by bacteria obtained from different environments." Journal of Polymers and the Environment 26.2 (2018): 680-690.
Kawashima et al. "Pilot-Scale Composting Test of Polylactic Acid for Social Implementation" Sustainability 2021, 13, 1654. (2021).
Teixeira et al. "Towards controlled degradation of poly (lactic) acid in technical applications." C 7.2 (2021): 42.
Tomita et al. "Isolation and characterization of a thermophilic bacterium, Geobacillus thermocatenulatus, degrading nylon 12 and nylon 66." Biotechnology letters 25.20 (2003): 1743-1746.

* cited by examiner

*Primary Examiner* — Jyoti Mutreja
(74) *Attorney, Agent, or Firm* — NIXON PEABODY LLP; Ronald I. Eisenstein; Nicole D. Kling

(57) ABSTRACT

The present invention relates to a method for degradation of a plastic-containing waste further comprising cellulosic, plant and/or animal waste, the method comprising mixing the plastic-containing waste with a composition comprising bacteria in the presence of air wherein the plastic containing waste is filled to a predetermined level in a digesting apparatus comprising of an elongated tank having one or more rotating mixing shafts provided with radially extending agitating blades fixed to the shafts, wherein the plastic containing waste has a surface-to-volume ratio of at least 1.1 when the digesting apparatus is filled to the predetermined level, whereby the surface area is the surface area in $m^2$ of the filled plastic containing waste to air interface, and the volume is the volume of the plastic containing waste in $m^3$.

17 Claims, No Drawings

METHOD FOR DEGRADATION OF A PLASTIC-CONTAINING WASTE

CROSS-REFERENCE TO RELATED APPLICATIONS

This application is a 35 U.S.C. § 371 National Phase Entry Application of International Application No. PCT/EP2021/071037 filed Jul. 27, 2021, which designates the U.S. and claims benefit under 35 U.S.C. § 119 (a) of EP Application Serial No. 20188192.7 filed Jul. 28, 2020, the contents of which are incorporated herein by reference in their entireties.

FIELD OF THE INVENTION

The present invention relates to a method of processing waste, in particular to a method of on-site waste processing, in particular of on-site processing of plastic-containing waste.

BACKGROUND OF THE INVENTION

Polylactic acid (PLA) is one of the most widely used bioplastics for food and drink disposables. poly (lactic acid) (PLA), does not biodegrade as fast as other organic wastes during composting. In household settings, composting PLA may take 1-2 years, mainly because environmental conditions are not optimal. In industrial settings, compositing PLA bottles may take months. The biodegradability of poly(lactic) acid (PLA) has been described. T. Apinya, et al. (2015) Int. Biodeterior. Biodegrad. 99: 23-30, describe the biodegradability of poly(lactic) acid (PLA) by the actinomycete *Pseudonocardia* sp. RM423. Soil bioaugmentation with *Pseudonocardia* sp. RM423 accelerated PLA biodegradation in the soil under both mesophilic and thermophilic conditions. JP2001178483 describes the degradation of PLA containing waste by *Alcaligenes*. Castro-Aguirre et al. 2018 described the biodegradation of PLA after bioaugmentation, which takes about 20-40 days.

There is a need for a method which can be used for quick and easy biodegradation of PLA on-site, where the waste is formed, without the need for transportation to an industrial facility.

DETAILED DESCRIPTION OF THE INVENTION

This is achieved by the following method. A method for degradation of a plastic-containing waste further comprising cellulosic, plant and/or animal waste, the method comprising mixing the plastic-containing waste with a composition comprising bacteria in the presence of air wherein the plastic containing waste is filled to a predetermined level in a digesting apparatus comprising of an elongated tank having one or more rotating mixing shafts provided with radially extending agitating blades fixed to the shafts, wherein the plastic containing waste has a surface-to-volume ratio of at least 1.1 when the digesting apparatus is filled to the predetermined level, whereby the surface area is the surface area in $m^2$ of the plastic containing waste to air interface, and the volume is the volume of the plastic containing waste in $m^3$.

Applicants found that the plastic containing waste can be digested for more than 96% within 5 days and even within 96 hours when the digesting is performed in the presence of cellulosic, plant and/or animal waste in the described apparatus and under the described surface-to-volume ratio conditions.

The method enables one to convert plastic containing waste and preferably biodegradable plastic containing waste, and even more preferably polylactic acid (PLA) and/or polybutyrate adipate terephthalate (PBAT) containing waste.

The method may be advantageously applied for digesting plastic-containing waste in combination with cellulosic, plant and/or animal waste material. The cellulosic, plant and/or animal waste material may suitably be one or more of food substances, biological substances, vegetable waste, animal by-products category 3 waste and/or cellulose rich materials, such as paper, cardboard and sugar cane-based products. Such plastic-containing waste may be waste from industry such as restaurant industry, food processing industry; waste from the hospitality industry; waste from the paper industry; waste from recycling facilities; waste from the food or feed industry; waste from the medicinal industry; waste from agriculture or farming related sectors; waste from processing of sugar or starch rich products; contaminated or in other ways spoiled agriculture products such as grain, potatoes and beets not exploitable for food or feed purposes. Waste may also comprise metal or glass pieces.

The plastic-containing waste may be hospital waste or waste from care institutions, such as waste containing parts or the whole of bandages, clothes, cups, diapers, dressings, filaments, matrices, pins, plates, rods, scaffolds, screws, syringes, threads or tubing of biodegradable plastic.

The plastic-containing waste is preferably plastic-containing food waste, such as raw or cooked food, food left overs or food scraps, past due date products from supermarkets, such as drinks, vegetables, meat and bones, mixed with plastic packaging, containers or cutlery, preferably mixed with biodegradable plastic packaging, containers or cutlery. Such plastic-containing food waste may be from food services, restaurants, hotels, catering services, hospitals, nursing homes, supermarkets, schools, governmental facilities, events, dance festivals or universities.

The plastic-containing waste is preferably reduced in size to facilitate digestion, for example by cutting or shredding. A suitable size for the plastic material in the waste is about 1-1.5 square cm. For film like plastic material this accounts to a surface area of between 2 and 3 square cm. Smaller pieces will also yield good results. Larger piece may require longer for complete digestion.

If the waste also comprises metal or glass pieces, these pieces will remain substantially unaffected after the degradation according to the method of the invention, but may be removed, for example by sieving out.

The plastic content of the waste may be in the range of 0.1% w/w to 60% w/w, based on 100% dry matter, such as between 1% w/w and 60% w/w, between 10% w/w and 60% w/w, between 20% w/w and 40% w/w based on 100% dry matter and preferably between 1% and 30% w/w/based.

On-site refers to the possibility to process this waste at or near the site where the waste is produced. There is no need to transport the waste for processing in any kind of industrial facility. This saves costs and provides for a reduction in the carbon foot print. The volume reduction of the waste which is achieved with the method according to the invention adds to this advantage. Volume reduction of the waste is preferably at least 70%, at least 80% or at least 85% of the starting volume.

During digesting, moisture content of the waste is preferably maintained at 60%-80% w/w, more preferably at 60% to 70% w/w, based on the total weight of the waste, for example by spraying from time to time. This allows a large area of the mass to be exposed to oxygen, which is important for the digestion process. Preferably, water is used to keep moisture. The water may be tap water, waste water, rain water, preferably waste water is used.

The pH of the starting material is preferably between pH 4.5 and pH 6.

This method according to the invention allows a wide variety of food and drink disposables to be digested together with food locally, on-site, without the need to for transportation to any kind of industrial facility.

Bacteria may be added to the reactors, preferably at least to the digesting apparatus while performing the method. This may be performed by an automated feeder which adds the bacteria at predetermined times and predetermined quantities in a batch operation. The bacteria are preferably present in a composition further comprising a bacterial growth medium being at least one member of the group consisting of maltodextrin, AGAR broth medium, *Lithothamnium calcareum*, DNA and RNA nucleic acids, extracts of Laminariae Stipites, and extracts of *Fucus vesiculosus*.

Applicants found that an even more advantageous method is obtained when the method is performed in two or more digesting apparatuses in series in the presence of oxygen and bacteria. The digesting in the reactor spaces suitably take place as a semi-batch type operation.

Preferably plastic waste containing material is added continuously or intermittedly in a batch operation to the apparatus which apparatus comprises wet digested material and bacteria from an earlier batch. At the end of a batch operation the content of the apparatus is partly removed from the apparatus and part of the wet digested material and bacteria remain in the apparatus for performing a next batch. Preferably between 10 and 40 wt. % of the content of the apparatus remains in the apparatus or in the first reactor apparatus when more than one apparatuses are used in series at the end of the batch operation.

Fresh plastic containing waste may be added at the beginning of the batch operation or may be continuously or intermittently added in one batch operation to the apparatus during the entire duration of the batch operation. Suitably at least 80 wt. % of the organic waste is added to the apparatus or the first apparatus when a series of apparatuses are used in a period between 0 and 24 hours from the start of the addition of waste material in the batch operation. Fresh organic waste added at the end of the batch operation will not have been digested to a large degree. This is however not a problem when a final digesting takes place in a further optional apparatus. If the residence time in a second apparatus is sufficiently long an acceptable digesting conversion may be achieved using only two apparatuses in series.

The waste starting material may be suitably mixed with a composition comprising bacteria belonging to the genus *Geobacillus*. This genus includes Gram-positive spore-forming bacteria, some of which were formerly classified within the genus *Bacillus* group 5 and referred to as Bacilli. Suitable *Geobacilli* for use in the method according to the invention include *Geobacillus caldoxylosilyticus, Geobacillus kaustophilus, Geobacillus stearothermophilus, Geobacillus subterranens, Geobacillus thermocatenulatus, Geobacillus thermodenitrificans, Geobacillus thermoglucosidans, Geobacillus thermoleovorans* or *Geobacillus uralicus*. Preferred species are thermophilic. In one embodiment, *Geobacillus thermoleovorans* is used, more preferably *Geobacillus thermoleovorans* (Zarilla and Perry 1988; DSM 5366, ATCC 43513). In a preferred embodiment, species of *Geobacillus thermoleovorans* make up at least 80%, at least 85%, at least 90%, at least 95% or at least 99% of the number of bacteria in the composition. In another preferred embodiment, species of *Geobacillus thermoleovorans* make up 100% of the bacteria in the composition. Thermophilic bacteria in general show optimal growth at a temperature in the range of 40 to 80 DEG C. In the method of the present invention, the temperature of the mass to be digested is preferably maintained in the range of 50 to 70 DEG C., 50 to 60 DEG C. or 55 to 65 DEG C., most preferably the temperature of the mass to be digested is maintained at 60 DEG C.

The *Geobacilli* may be isolated from suitable sources, such as from soil, digestive or hot water springs, or may be obtained from international strain collections of microorganisms, for example from DSMZ or ATCC. The bacteria may be propagated by incubation at 55 DEG C.-60 DEG C. in rich medium, such as R2 broth (R2B; comprising 0.5 g yeast extract, 0.5 g proteose peptone #3, 0.5 g casamino acids, 0.5 g dextrose, 0.5 g soluble starch, 0.3 g sodium pyruvate, 0.3 g dipotassium phosphate and 0.05 g magnesium sulphate per liter $H_2O$), or on minimal medium, such as M9 (M9 comprising 12.8 g, $Na_2HPO_4 \cdot 7H_2O$, 3 g $KH_2PO_4$, 0.5 g NaCl, 1 g NH4Cl and 1 g of 1 mM MgSO4, 1 mM $CaCl_2$), $3 \times 10^{-9}$ M $(NH4)_6Mo_7O_{24} \cdot 4H_2O$, $4 \times 10^{-7}MH_3BO_3$, $3 \times 10^{-8}$ M $CoCl_2 \cdot 6H_2O$, $1 \times 10^{-8}$ M $CuSO_4 \cdot 5H_2O$, $8 \times 10^{-8}M$ $MnCl_2 \cdot 4H_2O$, $1 \times 10^{-8}M$ $ZnSO_4 \cdot 7H_2O$, $1 \times 10^{-6}M$ $FeSO4 \cdot 7H_2O$). The bacterial formulation may further comprise vitamins, for example one or more of biotin, folic acid, nicotinic acid, riboflavin and thiamine; and trace elements, for example 0.01 g/l to 1 g/l of one or more of EDTA, $MgSO_4 \cdot 7H_2O$, $MnSO_4 \cdot H_2O$, $FeSO_4 \cdot 7H_2O$, $Co(NO_3)_2 \cdot 6H_2O$, $CaCl_2$ (anhydrous), $ZnSO_4 \cdot 7H_2O$, $CuSO_4 \cdot 5H_2O$, $AlK(SO_4)_2$ (anhydrous), $H_3BO_3$, $Na_2MoO_4 \cdot 2H_2O$, $Na_2SeO_3$ (anhydrous), $Na_2WO_4 \cdot 2H_2O$, $NiCl_2 \cdot 6H_2O$.

After reaching the required yield, cells are harvested by centrifugation, dried, preferably lyophilized, and formulated with nutrients, vitamins, minerals and/or vegetable support for the bacteria, such as a nitrogen source, a phosphorus source, amino acids, zeolite, carbonate or wheat bran. In one embodiment, the bacteria are grown on an algal scaffold, for example *Lithothamnium calcareum*, which provides both nutritious elements, such as calcium, magnesium and iron, and volume to the formulation.

The formulation is preferably in dry form, for example a powder. The bacteria in the powder are in rest and become active when they come into contact with moisture. Since the formulation contains nutrients, vitamins and minerals to support bacterial growth, bacterial growth can start without much delay. The formulation preferably contains approximately $10^4$ to $10^9$ bacteria/g of the formulation. In one embodiment, $10^9$ bacteria/g formulation is used. To determine cell concentration, cells are counted, for example by conventional techniques for agar plate cell counting.

The formulation may be comprised in a starter compost. In one embodiment, the starter digestive comprises between 0.5% w/w and 1% w/w of the bacterial formulation.

In the context of the present invention, composting or digesting refers to the degradation of organic waste into organic matter (compost) by microorganisms in the presence of oxygen. The compost or digestive is an amorphous humus-like material which may be used as a nutrient rich soil conditioner. State of the art composting processes typically take several months and non-organic material such as plastics are not degraded under non-industrial conditions.

The plastic in the waste is preferably a biodegradable plastic, such as polybutyrate adipate terephthalate (PBAT) or PLA. The plastic may be 100% of one type of plastic, may be mixed with other plastics, preferably biodegradable plastic, or may be mixed with other material, for example with plant based material. In one embodiment, the plastic in the waste is used as a lamination for plant fibers, such as sugar cane fibers or bamboo fibers. There is no need to first separate plant fibers and plastic lamination for digestion according to the method of the invention. The plastic may be sturdy, hard, moulded, for example cutlery, trays, cups, tableware; or soft and thin, for example a film or a soft bag.

In the context of the present invention, polylactic acid (PLA) refers to a thermoplastic polyester with backbone formula $(C3H4O2)n$, which may be obtained by polycondensation of lactic acid $C(CH3)(OH)HCOOH$ or through polymerisation of lactide molecules. The lactic acid monomers may be obtained from renewable sources, such as corn starch, cassava starch or sugar cane, by microbial fermentation. Polylactic acid (PLA) may refer to any form of polylactic acid, such as poly(L-)lactic acid (PLLA), poly (D-)lactic acid (PDLA) or poly (D, L-)lactic acid (PDLLA). The polylactic acid may be in crystallised form. Polylactic acid (PLA) is marketed as biodegradable and compostable. In ambient conditions, at home, degrading or composting PLA will takes months or years. Therefore, PLA requires industrial facilities to break down. Under industrial conditions, composting of PLA may take 1 to 6 months.

In contrast to existing methods for plastic degradation, the method according to the invention allows for fast degradation of plastic-containing waste into organic matter and makes the on-site degradation of plastic-containing waste possible. As a consequence, it eliminates the need for processing in any kind of industrial facility. The plastic in the waste will be degraded within 7 days (168 hours) from the start of the digestion process, such as within 6 days, within 5 days, within 4 days, within 3 days, within 48 to 96 hours or within 72 to 96 hours using the method according to the invention.

Another advantage of the composition comprising bacteria belonging to the genus *Geobacillus* is that it allows biological initiation of the decomposition while limiting the proliferation of pathogenic germs. In contrast to pathogenic germs, the *Geobacilli* in the composition resist 1 hour at 70 DEG C., which can therefore be used to kill of pathogens without substantially affecting the soil condition qualities of the decomposed material.

In addition to *Geobacilli*, the composition may also comprise other micro-organisms, such as *Bacillus* bacteria, such as the *Bacillus licheniformis*, as long as they do not interfere with the degradation process. It is found that the *Bacillus licheniformis* may also be used instead of the *Geobacilli*. The *Bacillus licheniformis* may be applied in the same manner and amounts/percentages as described above. These bacteria include *Bacillus licheniformis* strains. More preferably the *B. licheniformis* strain BLH20, deposited by the company HTS BIO SA, Parc d'activite de Gemenos, 180-210 avenue de la Roque Forcade, 13420 Gemenos, France, at CNCM under the Budapest Treaty on 1 Apr. 2021 number CNCM I-5667 is used because of its ability to quickly decompose plastics and cellulosic, plant and/or animal waste as illustrated in the examples. Mutants and derived strains of the *Bacillus licheniformis* and especially of the deposited strain are also suitable for this invention. CNCM I-5667 is a thermophilic Bacteria isolated from a compost obtained during the composting at 60° C. of organic waste and PLA (polylactic acid) bioplastic waste in a composting machine. Identification of the genus and bacterial species of CNCM I-5667 was validated by analysis of the 16S rRNA, gyrB and dnaK phylogenetic markers sequences.

The composition is suitable for the degradation of plastic, in particular biodegradable plastic, such as PLA or PBAT, and suitable for the degradation of cellulosic, plant and/or animal waste and especially food substances, biological substances, animal by-products category 3 waste (Category 3 ABPs as for example defined in https://www.gov.uk/guidance/animal-by-product-categories-site-approval-hygiene-and-disposal) and cellulose rich materials such as paper, cardboard and sugar cane-based products. As a consequence, the consortium is very suitable for degradation of a mixture of plastic and any one or more of the above mentioned materials. The composition comprising the above referred to bacteria i may be used for the recovery of organic waste in combination with plastic-based disposable food and drink products and packaging.

The composition comprising the above described bacteria digests many types of organic matter in combination with plastic disposables in a very short period of time. Using the method according to the invention, the digestion process is completed within 7 days (168 hours) from the start of the digestion process, such as within 7 days, within 6 days, within 5 days, within 4 days, within 3 days, within 48 to 96 hours or within 72 to 96 hours. This is much faster than state of the art composting which typically takes several months. The digesting process is completed when an amorphous humus-like material is obtained, indicative that the waste has been converted to organic matter. Preferably, at least 80% w/w, at least 90% w/w, more preferably at least 95% w/w, at least 98% w/w or at least 99% w/w of the plastic-containing waste has been converted into organic matter. In one embodiment, at least 80% w/w, at least 90% w/w, more preferably at least 95% w/w, at least 98% w/w or at least 99% w/w of the plastic-containing waste has been converted to organic matter within 5 days, within 4 days, within 48 to 96 hours or within 72 to 96 hours after the start of the digesting process.

During digestion, the plastic in the waste disappears, since it is also converted to organic matter. In one embodiment, at least 80% w/w of the plastic in the waste has disappeared within 7 days. In one embodiment, at least 90% w/w, more preferably at least 95% w/w, at least 98% w/w or at least 99% w/w of the plastic in the waste has disappeared within 5 days, within 4 days, within 48 to 96 hours or within 72 to 96 hours after the start of the digesting process. Most preferably, there are no traces of plastic visible after the digesting process according to the invention. The digestion starts when waste is mixed with a composition comprising the above described bacteria at a temperature of 50 to 70 DEG C., 50 to 60 DEG C. or 55 to 65 DEG C. under moist conditions.

In one embodiment, the composition comprising bacteria belonging to, the genus *Geobacillus*, or *Bacillus* or according to a particular embodiment the strain *Geobacillus thermoleovorans DSM* 5366 or *Bacillus licheniformis* CNCMI-5667 or bacteria derived therefrom, further referred to as the preferred bacteria, are used in combination with a digesting apparatus, comprising a tank with mixing means, for mixing and rotating the material to be digested; ventilation means for the supply of oxygen, preferably in the form of air; a water inlet for supplying water; means for dosing the waste. Fresh waste may be added continuously or from time to time, whenever fresh waste is available. The digesting apparatus is preferably also provided with humidity and temperature control.

The preferred digesting comprising bacteria belonging to the genus *Geobacillus* or *Bacillus* enables to achieve maximum efficiency and quick start the digesting process. The composition comprising the preferred bacteria belonging to the genus *Geobacillus* or *Bacillus* and the compositing apparatus may be used for the recovery of food waste in combination with plastic-based disposable food and drink products and packaging. This can be cellulose, paper, bagasse and PLA or PBAT disposables in any combination and mixture. Food and drink disposables and organic waste are digested in the same machine, at the same time.

The composition comprising bacteria belonging to the genus *Geobacillus* or *Bacillus* is preferably used in combination with a digesting apparatus comprising a tank with mixing means, for mixing and rotating the material to be digested; means for dosing the waste; ventilation means for the supply of oxygen, preferably in the form of air, and for controlling humidity; a water inlet for supplying water and means for dosing the waste. The digesting apparatus is preferably also provided with humidity and temperature control. Humidity is preferably approximately 60% relative humidity (RH). At the start of the digesting process humidity may be higher, for example at least 75% RH. At the end of the process, at the drying phase, humidity is approximately 14% RH. In one embodiment, humidity and temperature are time-controlled. For example, humidity is set for the first 5-8 hours at least 75% RH, the next 5-8 hours at 60-70% RH, and the last 5-8 hours, at the drying phase, at 10-14% RH. The mixing means are designed to slowly mix the solids such that on the one hand oxygen from the air contacts the solids and on the other hand the solids remain sufficiently wet as described earlier for the bacteria to function. Suitably the mixing means are rotating mixing means as described below which are operated at between 0.5 and 1.5 rotations per minute and preferably between 0.8 and 1.2 rotations per minute.

Such machines are known in the art. For example, a digesting apparatus comprising an elongated tank having one or more rotating mixing shafts provided with radially extending agitating blades fixed to the shafts. Preferably the digesting apparatus is provided with two rotating mixing shafts. Preferably also a screw feeder is present at the lower end of the apparatus to discharge the composted material from the apparatus. The walls are heated walls such to achieve the desired operating temperature by heat exchange between the walls and the mixture of bacteria and plastic containing waste. In a preferred embodiment the apparatus comprises an elongated tank into which the plastic containing waste can be charged. The tank comprises an inlet for plastic containing waste, an outlet for composted material. The tank is provided with two rotating mixing shafts provided with a helical mixing element connected to the shafts by supports which radially extend from the shaft. The two shafts are positioned substantially parallel with respect to each other in the elongated direction of the tank thereby defining two cylindrical mixing zones in the tank. Below each of the two cylindrical mixing zones an elongated heated semi-tubular surface is provided as the lower inner heated wall of the tank. A screw feeder is positioned at the lower inner wall of the tank between the two semi-tubular surfaces and positioned in a tubular housing which tubular housing is open at its upper end facing the interior of the tank. In use digested material may be moved to the outlet for digested material by the screw feeder. Preferably the helical mixing element is a blade which runs at a certain distance from the semi-tubular surfaces. The blade is shaped such that its entire blade surface runs parallel to the semi tubular surfaces at the certain distance from the semi-tubular surfaces. Preferably this distance is smaller than 1 cm and more preferably smaller than 0.5 cm. It has been found that such a design will avoid excessive coking of the heated walls. Such an apparatus is described and illustrated in EP3581551.

Another example is a digesting apparatus as described in NL2018141 comprising a trough, for containing the digesting material and air, and a shaft, arranged to blend the digesting material. The shaft extends in the trough, and the digesting apparatus is configured such that the trough with digesting material has a surface-to-volume ratio of the surface area in $m^2$ of the digesting material to air interface to the volume in $m^3$ of the digesting material of at least 1.1, when filled to a predetermined level.

In combination with a digesting machine as described in EP3581551, the rate of biodegradation is substantially improved. This may be apparent from a completer reduction of plastic achieved in less days, an expansion of the range of compostable waste fractions or reduction of power consumption, all in comparison to other digesting machines.

Suitable sizes of digesting machines for on-site degradation of plastic-containing waste using the method according to the invention for food services, restaurants, hotels, catering services, hospitals, nursing homes, supermarkets, schools, governmental facilities, events, dance festivals or universities are digesting machines which allow an input of 100 to 300 kgs per day. Tank volume may vary between 0.5 and 1.5 cubic meters.

Although conditions, such as humidity and temperature may be controlled manually, the digesting apparatus is preferably equipped with a control unit with sensors for controlled and automated water addition, temperature setting and air supply. The humidity is preferably at least 60% RH, for example at least 75% RH at the beginning of the digesting process and after a few hours maintained at 65% RH until a few hours before drying. This may be done automatically by a humidity sensor connected to a PLC, which in turn controls the water inlet. The temperature of the mass to be digested is preferably maintained at 55 DEG C. to 70 DEG C., more preferably at 60 DEG C. to 65 DEG C., most preferably at 60DEG C. At temperatures lower than 50 DEG C., the plastic material will not be degraded fast enough. At temperatures higher than 70 DEG C., the conditions are not optimal for digestion. A suitable temperature sensor is a PT100, typically part of a resistive temperature device. The digesting machine may be customised to customers' packaging characteristics. Air supply may be between 3000 l/min, for a digesting device of 500 liter, and 9000 l/min for a digesting device of 9000 liter. Aeration also facilitates removal of moisture by evaporation. Preferably, evaporation is the main way or only way for removing moisture and controlling humidity.

Using the method according to the invention, less waste is produced. A reduction of about 85% may be obtained, leading to less transportation costs and a smaller carbon food print.

The biodegraded material obtained after digestion contains at least 85% or at least 90% dry matter and at least 90% organic matter on 100% dry matter. It contains macronutrients, micronutrients and trace elements. In one embodiment, the nitrogen content is in the range of 2-3% w/w, the phosphate is in the range of 2-5% w/w and the potassium is in the range of 8-12% w/w, on the all on 100% dry matter.

It may be used for biogas production or be used as a soil conditioner. Biogas production is typically in an anaerobic fermenter, yielding methane. The biodegraded material meets the criteria for compost in France and the Netherlands. Therefore, it may be used for soil conditioning, optionally after upgrading with microbial cultures or enzymes.

EXAMPLES

The below examples 1 to 6 were performed in an apparatus having a volume of 680 liter. The apparatus had one cylindrical mixing zone having a diameter of 0.76 m and one rotating mixing shaft provided with radially extending agitating blades are fixed to the shaft. The walls of the apparatus are heated. In all the experiments using this apparatus the plastic contain waste is filled to a level such that the surface area of the plastic containing waste to air interface is well above 1.1 m2/m3 before starting the method. The agitation in all experiments was kept at the same level. In all examples the mixing shaft was operated at one rotation per minute.

The below examples 7 and 8 were performed in an apparatus having a volume of 114.1 liter. The apparatus had one cylindrical mixing zone having a diameter of 0.4 m and one rotating mixing shaft provided with radially extending agitating blades are fixed to the shaft. The walls of the apparatus are heated. In all the experiments using this apparatus the plastic contain waste is filled to a level such that the surface area of the plastic containing waste to air interface is well above 1.1 m2/m3 before starting the method. The agitation in all experiments was kept at the same level. In all examples the mixing shaft was operated at one rotation per minute.

Example 1 Preparation of the Bacterial Formulation

A 1 ml starter culture of *Geobacillus thermoleovorans* DSM 5366 was obtained from DSMZ and used to inoculate 25 ml of R2 broth (R2B; comprising 0.5 g yeast extract, 0.5 g proteose peptone #3, 0.5 g casamino acids, 0.5 g dextrose, 0.5 g soluble starch, 0.3 g sodium pyruvate, 0.3 g dipotassium phosphate and 0.05 g magnesium sulphate per liter $H_2O$) in a 100-ml Erlenmeyer flask and incubated overnight at 60 DEG C. in an Innova™ 4300 shaker (New Brunswick Scientific Co., Edison, NJ, USA). This culture was used as inoculum for a 500 ml culture, also in R2B, and incubated for 48 h in the shaker at 60 DEG C. Cells were then harvested by centrifugation, lyophilized and formulated with nutrients, such as a source of nitrogen and phosphorus, vitamins, amino acids, mineral salts, mineral support and wheat bran to reach a bacterial formulation with approximately $10^9$ bacteria/g of the formulation.

Example 2 Biodegradation of Laminated Sugar Cane

Ten 230×165×30 mm 600 ml meal trays made of sugar cane laminated with polybutyrate adipate terephthalate (PBAT) (Art. no. 18009, Pacovis GmbH, Germany) were shredded into pieces of approximately 1.5 square cm and fed into a digesting device comprising 15 kg starter digestive of digested organic material comprising 100 g of a bacterial formulation according to Example 1. The mixture was incubated at 60 DEG C. to allow for digestion. The humidity in the digesting device was 65% RH. The product temperature was 60 DEG C. After 24 hrs digestion was stopped by setting the machine at 70 DEG C. for one hour. No remaining parts of plastic could be determined visually.

Example 3 Biodegradation of Sugar Cane Lids

Ten sugar cane lids, approx. 230×165 mm, (Art. no. 17914, Pacovis Deutschland GmbH, Germany) was shredded into pieces of approximately 1.5 square cm and fed into a digesting device comprising 15 kg starter digestive of digested organic material comprising 100 g of a bacterial formulation according to Example 1. Humidity was maintained at 65% RH. The product temperature was maintained at 60 DEG C. After 24 hours of digestion, the digest was incubated at 70 DEG C. for one hour. No remaining parts of sugar cane plastic could be determined visually.

Example 4 Biodegradation of PLA Bowls

Ten rectangular transparent PLA bowls (Pacovis Deutschland GmbH, Germany) were shredded and cut into pieces of approximately cm 1.5 square cm (total surface area 3 square cm) and fed into a digesting device comprising 15 kg starter digestive of digested organic material comprising 100 g of a bacterial formulation according to Example 1. Humidity was maintained at 65% RH. The product temperature was maintained at 60 DEG C. After 78 hours, the PLA bowls had been digested. This was followed by incubating at 70 DEG C. for one hour. No remaining parts of PLA plastic could be determined visually.

Example 5 Biodegradation of PLA Bioplastic Bag

A PLA plastic bag (Naturesse, Pacovis Deutschland GmbH, Germany) was shredded into pieces of approximately 1 square cm and fed into a digesting device comprising 15 kg starter digestive of digested organic material comprising 100 g bacteria of a bacterial formulation according to Example 1 in a digesting apparatus at 65 DEG C. for 56 hours. Conditions were as described in Example 4. After 56 hours, the plastic bag had been digested completely.

Example 6 Plastic Reduction Comparison

The plastic concentrations in digestive samples treated and not treated with a composition comprising bacteria belonging to the genus *Geobacillus* were analysed and compared. Cups, trays and blister carrier material containing PLA plastic, shredded into pieces of approximately 1 square cm, were digested at 60 DEG C. for 3 days according to the method of the invention, using starter digestive comprising 0.5% w/w of a bacterial formulation according to Example 1. As a control, cups, trays and blister carrier material were digested under similar conditions, without the addition of thermophile bacteria not including *Geobacilli thermoleovorans* DSM 5366. Results are shown in Table 1.

Using the method according to the invention, the plastic content was only 0.2 gram plastic/kg digested waste on 100% dry matter. When no method according to the invention was used, the result was 27.8 gram plastic/kg digested waste on 100% dry matter. This shows that the method according to the invention using of a bacterial formulation according to Example 1, leads to a better reduction in plastic than without the formulation.

TABLE 1

| Samples | Plastic content (g/kg), on 100% dry matter |
| --- | --- |
| Digestive with PLA, without composition comprising *Geobacilli Thermoleovorans* DSM 5366 | 27.8 |
| Digestive with PLA, with composition comprising *Geobacilli Thermoleovorans* DSM 5366 | 0.2 |

Example 7

Inoculation according to Example 1 is repeated to with *Geobacilli thermoleovorans* DSM 5366. On Day 0 15 kg vegetables and 1.5 kg a composition with *Geobacilli thermoleovorans* DSM 5366 was allowed to incubate at 60 DEG C. The humidity in the digesting device was 65% RH. The product temperature was 60 DEG C.

After 24 hrs digestion (Day 1) 1.5 kg of shredded PLA (Naturesse, Pacovis Deutschland GmbH, Germany as shredded into pieces of approximately 1 square cm) and 10 kg of cooked fish and seafood, bread and vegetables was added to the apparatus. After 24 hours visual observation showed that the cooked fish and seafood, bread and vegetables were mostly digested and that PLA particles were sill visible.

After 24 hours (Day 2) 20.5 kg of cake, bread, dry pasta and water was added to the apparatus.

After 24 hours (Day 3) 23 kg of cake, bread, pizza and raw meat was added.

After 24 hours (Day 4) 5.5 kg of bread, cake and vegetables was added. The method was continued for another 24 hours, wherein in the last hour the temperature was increased to 70 DEG C. A tawny colored dry powder is obtained and based on the feed a weight reduction of about 55% is measured. The reduction in plastics during the course of the experiment is provided in Table 2. Wherein the plastic reduction is defined as 100% minus the percentage of plastic particles having a size of greater than 2 mm and wherein the plastic concentration is the weight concentration of plastic particles having a size of greater than 2 mm. The measurements were performed by AUREA laboratory according to NF U 44 164 standards.

Example 8

Inoculation of a thermophilic bacterial strain of *Bacillus licheniformis* deposited at CNCM (French National collection of culture of microorganisms) under the registration number CNCM I-5667 by the company HTS BIO SA was performed similar to the procedure of Example 1. On Day 0 50 kg vegetables and 1.5 kg of the same composition as in Example 7 but comprising *Bacillus licheniformis* CNCM I-5667 instead of *Geobacillus thermoleovorans* DSM 5366 was allowed to incubate at 60 DEG C. The humidity in the digesting device was 65% RH. The product temperature was 60 DEG C.

After 24 hrs digestion (Day 1) 1.5 kg of shredded PLA (Naturesse, Pacovis Deutschland GmbH, Germany as shredded into pieces of approximately 1 square cm) and 23.5 kg of raw seafood was added to the apparatus. After 24 hours visual observation showed that the raw seafood were mostly digested to a powder and that PLA particles were sill visible.

After 24 hours (Day 2) 30 kg of vegetables, fruits, salted fish, dry rice and water was added to the apparatus.

After 24 hours (Day 3) 30.5 kg of vegetable, cake and rolled cardboard was added.

After 24 hours (Day 4) 14 kg of bread and cooked seafood was added. The method was continued for another 24 hours, wherein in the last hour the temperature was increased to 70 DEG C. A dark brown colored dry powder is obtained and based on the feed a weight reduction of about 58% is measured. The reduction in plastics during the course of the experiment is provided in Table 2.

TABLE 2

| Example | Day 1 | Day 2 | Day 3 | Day 4 | Day 5 |
| --- | --- | --- | --- | --- | --- |
| 7: *Geobacillus Thermoleovorans* DSM 5366 | | | | | |
| Plastic concentration (>2 mm)(wt % on dry matter) | 22 | 19 | 11 | 3 | <1 |
| Plastic reduction (%) | 0 | 15 | 49 | 86 | 96 |
| 8: *Bacillus licheniformis* CNCM I-5667 | | | | | |
| Plastic concentration (>2 mm) | 21 | 11 | 5 | <1 | <1 |
| Plastic reduction | 0 | 45 | 73 | 96 | 96 |

The results in Table 2 show that PLA plastic can be degraded within 5 or even 4 days to acceptable levels. Further the results seems to suggest that the bacteria of Example 8 are more effective than the bacteria of Example 7.

Comparative Experiment A

The digesting activity of the bacteria of Examples 7 and 8 were also tested in the same apparatus and conditions except with no mixing. After 7 days no significant digesting activity was observed and no significant reduction of the PLA particles was observed.

Comparative Experiment B

The composting activity of the bacteria of Examples 7 and 8 were also tested in vitro on a mixture of PLA and organic waste where no active mixing took place at 60 DEG C. and at 65% RH. After 7 days no significant composting activity was observed and no significant reduction of the PLA particles was observed.

The invention claimed is:

1. A method for degradation of a plastic-containing waste further comprising cellulosic, plant and/or animal waste, the method comprising mixing the plastic-containing waste with a composition comprising bacteria in the presence of air wherein the plastic containing waste is filled to a predetermined level in a digesting apparatus comprising of an elongated tank having one or more rotating mixing shafts provided with radially extending agitating blades fixed to the shafts, wherein the plastic containing waste has a surface-to-volume ratio of at least 1.1 when the digesting apparatus is filled to the predetermined level, whereby the surface area is the surface area in $m^2$ of the filled plastic containing waste to air interface, and the volume is the volume of the plastic containing waste in $m^3$;

wherein the plastic comprises polylactic acid (PLA) or polybutyrate adipate terephthalate (PBAT); and wherein the bacteria belongs to the *Geobacillus thermoleovorans* or the *Bacillus licheniformis*.

2. The method according to claim 1, wherein the cellulosic, plant and/or animal waste is one or more of food substances, biological substances, vegetable waste, animal by-products category 3 waste and/or cellulose rich materials.

3. The method according to claim 1, wherein the plastic content is in the range of between 1 and 30% w/w based on 100% dry matter of the plastic-containing waste.

4. The method according to claim 1, wherein the composition comprising microorganisms bacteria belonging to the *Geobacillus thermoleovorans* or the *Bacillus licheniformis* is provided in dry form.

5. The method according to claim 1, wherein the composition comprising microorganisms bacteria belonging to the *Geobacillus thermoleovorans* or the *Bacillus licheniformis* is comprised in a starter compost.

6. The method according to claim 1, wherein the bacteria belongs to the *Bacillus Licheniformis*.

7. The method according to claim 6, wherein the *Bacillus Licheniformis* is a *Bacillus Licheniformis* strain deposited under CNM I 5667 by HTS BIO SA or bacteria derived therefrom.

8. The method according to claim 1, wherein the plastic containing waste is waste from food services, restaurants, hotels, catering services, hospitals, nursing homes, supermarkets, schools, governmental facilities, events, dance festivals or universities.

9. The method according to claim 1, wherein the plastic-containing waste comprises discarded plastic cutlery, cups, plates, tableware, packaging bandages, clothes, cups, diapers, dressings, filaments, matrices, pins, plates, rods, scaffolds, screws, syringes, threads or tubing.

10. The method according to claim 1, wherein the cellulosic, plant and/or animal waste material is one or more of food substances, biological substances, vegetable waste, animal by-products category 3 waste and/or cellulose rich materials.

11. The method according to claim 1, wherein the degradation takes place at a temperature in the range of 60 DEG C. to 65 DEG C.

12. The method according to claim 1, wherein degradation takes place in a compositing apparatus comprising means for dosing the waste, mixing means, ventilation means, a water inlet, humidity control and temperature control.

13. The method according to claim 1, wherein the humidity during digestion is at least 60% RH.

14. The method according to claim 1, wherein the mixing shafts rotate at a speed of between 0.8 and 1.2 rotations per minute.

15. The method according to claim 1, wherein the digesting apparatus comprises an elongated tank into which the plastic containing waste is filled to the predetermined level, wherein the tank comprises an inlet for organic waste, an outlet for digested material and wherein the tank is provided with two rotating mixing shafts provided with a helical mixing element connected to the shafts by supports which radially extend from the shaft, wherein the two shafts are positioned substantially parallel with respect to each other in the elongated direction of the tank thereby defining two cylindrical mixing zones in the tank, wherein below each of the two cylindrical mixing zones an elongated heated semi-tubular surface is provided as the lower inner wall of the tank, wherein a screw feeder is positioned at the lower inner wall of the tank between the two semi-tubular surfaces and positioned in a tubular housing which tubular housing is open at its upper end facing the interior of the tank and wherein in use digested material may be moved to the outlet for digested material, and wherein the helical mixing element is a blade which runs at a certain distance from the semi-tubular surfaces.

16. The method according to claim 15, wherein the blade has a surface and is shaped such that entire surface of the blade is spaced apart from the two semi-tubular surfaces at a constant distance.

17. The method according to claim 16, wherein the distance between the blade and the semi-tubular surfaces is smaller than 1 cm, preferably smaller than 0.5 cm.

\* \* \* \* \*